US008585097B2

(12) United States Patent
Pillai et al.

(10) Patent No.: US 8,585,097 B2
(45) Date of Patent: Nov. 19, 2013

(54) PIPE STALK AND METHOD OF ASSEMBLING A PIPELINE THEREFROM

(75) Inventors: Arunkumar Pillai, Aberdeen (GB); Barry Presley, Aberdeenshire (GB); Alexandra Sperber, Aberdeen (GB); Patrick Renaud, Saint Germain en Laye (FR); Jean-Louis Hoss, Aberdeen (GB)

(73) Assignee: Technip France SA (FR)

( * ) Notice: Subject to any disclaimer, the term of this patent is extended or adjusted under 35 U.S.C. 154(b) by 403 days.

(21) Appl. No.: 12/744,960

(22) PCT Filed: Nov. 19, 2008

(86) PCT No.: PCT/GB2008/003867
§ 371 (c)(1),
(2), (4) Date: Jul. 23, 2010

(87) PCT Pub. No.: WO2009/068849
PCT Pub. Date: Jun. 4, 2009

(65) Prior Publication Data
US 2011/0101676 A1    May 5, 2011

(30) Foreign Application Priority Data
Dec. 1, 2007  (GB) .................................. 0723586.4

(51) Int. Cl.
*F16L 59/12*  (2006.01)
(52) U.S. Cl.
USPC .................. 285/123.3; 285/123.1; 285/123.5; 285/123.7

(58) Field of Classification Search
USPC .............................. 285/302, 47, 123.1–123.3, 285/123.5–123.7, 124.1–124.2, 288.1
See application file for complete search history.

(56) References Cited

U.S. PATENT DOCUMENTS

| 1,872,089 A | 8/1932 | McKee | |
|---|---|---|---|
| 4,060,263 A * | 11/1977 | Kotcharian | ..................... 285/47 |
| 2008/0315578 A1 | 12/2008 | Pionetti | |

FOREIGN PATENT DOCUMENTS

| FR | 2 873 427 A | 1/2006 |
|---|---|---|
| GB | 867 989 A | 5/1961 |

OTHER PUBLICATIONS

International Search Report dated Mar. 12, 2009, issued in corresponding international application No. PCT/GB2008/003867.

* cited by examiner

*Primary Examiner* — Aaron Dunwoody
*Assistant Examiner* — Fannie Kee
(74) *Attorney, Agent, or Firm* — Ostrolenk Faber LLP

(57) ABSTRACT

A pipe stalk for a pipe-in-pipe pipeline, the pipe stalk including an outer pipe and at least one inner pipe located within the outer pipe, and having a retaining assembly moveable between a first configuration for preventing axial movement of the inner pipe with respect to the outer pipe in a downwards direction and a second configuration for allowing axial movement of the outer pipe with respect to the inner pipe, whereby axial movement of the inner pipe with respect to the outer pipe can be prevented when the outer pipe is held during welding to an adjacent pipe stalk.

20 Claims, 7 Drawing Sheets

PIPE STALK AND METHOD OF ASSEMBLING A PIPELINE THEREFROM

CROSS REFERENCE TO RELATED APPLICATIONS

The present application is a 35 U.S.C. §371 National Phase conversion of PCT/GB2008/003867, filed Nov. 19, 2008, which claims benefit of British Application No. 0723586.4, filed Dec. 1, 2007, the disclosure of which is incorporated herein by reference. The PCT International Application was published in the English language.

BACKGROUND OF THE INVENTION

The present invention relates to a pipe stalk and a method for assembling a pipe-in-pipe pipeline from a plurality of such pipe stalks, and in particular to a method and apparatus for assembling a pipe-in-pipe pipeline directly on a pipe take-off assembly of a pipe laying vessel.

Marine pipelines for conveying gas or crude oil are typically laid from specialised pipelaying vessels or barges, whereby pipelines are deployed and lowered to the seabed in a controlled fashion, the pipelines either being assembled from individual pipe sections on the vessel (referred to as "stovepiping") or spooled from one or more reels mounted on the vessel (referred to as "reel pipelaying").

The stovepiping method generally requires the pipelaying operation to be periodically halted to permit additional pipe sections to be welded to the pipeline and also requires many experienced welders and additional welding equipment to be carried on the vessel, working in difficult conditions. Therefore stovepiping is a relatively slow and difficult process.

By contrast, reel pipelaying, wherein the pipeline can be prefabricated onshore and spooled onto a large reel, reduces the labour requirements onboard the vessel and considerably speeds up the pipelaying operation. However, a requirement of the reel pipelaying method is to provide means for straightening and guiding the pipeline as it leaves the reel, typically by means of a series of rollers or tracks that impart sufficient reverse bending force to residual curvature from the pipeline and guides the pipeline into the water at an angle optimised to reduce bending stresses.

The resistance to flow of liquid products such as oil increases as temperature decreases. Therefore it has become common to use double walled pipelines for transporting crude oil and gas from subsea locations, where the pipeline is formed from an inner pipe carrying the fluid to be conveyed, and a concentric outer pipe, the annular space between the inner and outer pipes being filled with a thermally insulating material to insulate the inner pipe. Such arrangements are known as "pipe-in-pipe" installations. A problem with such known arrangements is the need to perform two separate welding operations when joining two lengths of pipeline or individual pipe stalks together. To gain access to the inner pipelines it is often necessary to remove sections of the outer pipeline and then provide means for creating a joint between the ends of the outer pipeline once the inner pipeline has been welded.

Typically the outer pipes of a pipe-in-pipe flowline are joined together using two half shells required to bridge the gap between the ends of the outer pipes. This requires cutting of the pipe ends to ensure sufficient room for the half shells and several welding processes for joining the half shells to the ends of the adjacent outer pipes and to each other, leading to longer installation times and a greater risk of leakage. Additionally it is necessary to store the half shells on the installation vessel along with the pipe stalks, requiring greater storage space on the vessel and limiting the amount of pipe that can be laid.

SUMMARY OF THE INVENTION

According to a first aspect of the present invention there is provided a pipe stalk for a pipe-in-pipe pipeline, said pipe stalk comprising an outer pipe and at least one inner pipe located within the outer pipe, and having a retaining assembly moveable between a first configuration for preventing axial movement of the inner pipe with respect to the outer pipe in a downwards direction and a second configuration for allowing axial movement of the outer pipe with respect to the inner pipe, whereby axial movement of the inner pipe with respect to the outer pipe can be prevented when the outer pipe is held during welding to an adjacent pipe stalk.

The present invention saves CAPEX and OPEX by reducing the time taken to join the ends of adjacent pipes and reducing the total number of welds required, and by avoiding the need for the use of half shells.

The retaining assembly may comprise one, two or more components able to engage in at least the first configuration for preventing axial movement, and generally able not to engage or to disengage in the second configuration for allowing axial movement between the outer pipe and the inner pipe. Suitable components include one or more shoulders, pins, studs, plates and other projecting pieces, units or devices, optionally moveable with respect to the inner pipe(s), outer pipe or both.

The retaining assembly preferably comprises at least one component on an inner pipe, and at least one complementary and/or corresponding component on the outer pipe, optionally with one or more components thereinbetween. Preferably, the retaining assembly comprises non-joining components, that is components which are not required to be secured or fixed or attached to each other in either the first configuration or the second configuration. Preferably, such non-joining minimises and/or avoids actions required to provide the retaining assembly in its first configuration, second configuration or both.

In one embodiment of the present invention, the retaining assembly is at or near one end of the pipe stalk. Pipe stalks are typically elongate, more typically several or many meters long. The present invention is particularly advantageous by locating the retaining assembly at or near one end of the pipe stalk, so as to minimise interference in or along the remainder of the pipe stalk, generally comprising the majority of the length of the pipe stalk.

The pipe stalk of the present invention is intended to be the repeated item or section to create a pipeline for conveying a fluid flow such as gas or crude oil.

For the present invention, the welding of one pipe stalk to another pipe stalk is generally carried out vertically, or at least based on wholly or substantially vertical positioning and alignment of the pipe stalks. One pipe stalk can be held in a generally vertical position by a suitable clamp, such as a hang-off clamp, which pipe stalk may be the end section of a formed or forming pipeline.

Above such a held pipe stalk, a second pipe stalk can be held or supported by one or more other suitable clamps, able to be aligned above the top of the held pipe stalk so as to weld such pipe stalks together.

The welding of adjacent pipe stalks comprises at least the welding of the inner pipe of a first pipe stalk and the inner pipe of a second pipe stalk, generally after the alignment of the inner pipe of the first pipe stalk in a downward direction towards the top of the inner pipe of another pipe stalk, generally being the pipe stalk held in a vertical position by a hang off clamp.

In a preferred embodiment of the present invention, the retaining assembly is moveable between its first configuration and its second configuration after welding of the inner pipes of adjacent pipe stalks together.

Optionally, once two adjacent pipe stalks are welded together, generally comprising the welding of at least one inner pipe and the outer pipe, relative movement of the retaining assembly of each pipe stalk may or may not be required or necessary.

In a preferred embodiment, the retaining assembly comprises at least one first abutment provided on an inner surface of the outer pipe, at least one second abutment provided on an outer surface of the inner pipe and at least one key member insertable into the annular space between the inner and outer pipes into a position wherein the at least one key member is located between the first and second abutments corresponding to said first configuration of the retaining assembly to prevent axial movement of the second abutment past the first abutment and thereby prevent relative axial movement of the inner pipe and outer pipes, while allowing axial movement between the outer and inner pipes while the retaining assembly is in its second configuration to enable the inner pipes of adjacent ends of pipe stalks to be welded before moving the outer pipe with respect to the inner pipe to enable adjacent ends of the outer pipes to be welded together.

The first and second abutments may have any suitable shape, size and design, and may or may not be the same or similar, and/or corresponding and/or complementary. It is only required that the first and second abutments can at least abut with the key member(s) in the first configuration of the retaining assembly.

Preferably said first and second abutments each extend between the inner and outer pipelines over a segment of said annular space between said inner and outer pipes of said pipe stalk. The sum of the circumferential lengths of the first and second abutments may be substantially equal to the circumference of said annular space.

Preferably said at least one first abutment is circumferentially spaced from said at least one second abutment such that said first and second abutments can move past one another during axial movement of the outer pipe with respect to the inner pipe in the absence of said at least one key member.

Said at least one key member may comprise a segment of a ring having an inner diameter substantially equal to the outer diameter of the inner pipe and an outer diameter substantially equal to the inner diameter of the outer pipe.

The outer pipe may be provided with a pair of first abutments provided on the inner surface of the outer pipe at diametrically opposed locations thereon, said inner pipe being provided with a pair of second abutments provided on the outer surface of the inner pipe at diametrically opposed locations thereon, one of said first abutments being spaced approximately 90° from one of said second abutments in a circumferential direction, a pair of key members being provided to be insertable between the first and second abutments.

At least one holding means may be provided for selectively retaining the inner pipe with respect to the outer pipe when the pipe stalk is held in a clamp means by said outer pipe in a position wherein said inner pipe extends axially below the lower end of said outer pipe with said first abutments positioned axially above said second abutments to allow the inner pipe to be welded to the upper end of an inner pipe of a pipeline. Said holding means preferably comprises an elongate member having a first end adapted to engage an upper end of the outer pipe and a second end adapted to be connectable to one of said second abutments. The second end may be threaded to be received in a corresponding threaded aperture in the second abutment. The first end of said elongate member may be connectable to an upper edge of the outer pipe, for example, by means of a hook shaped end provided thereon.

Preferably a thermal insulation media is provided in the annular space between inner and outer pipes of the pipe stalk.

According to a further aspect of the present invention there is provided a pipeline when formed from a plurality of pipe stalks according to the first aspect of the present invention.

According to a further aspect of the present invention there is provided a method of assembling a pipe-in-pipe pipeline from a plurality of pipe stalks, each pipe stalk comprising an outer pipe and at least one inner pipe located within the outer pipe, and having a retaining assembly moveable between a first configuration for preventing axial movement of the inner pipe with respect to the outer pipe in a downwards direction and a second configuration for allowing axial movement of the outer pipe with respect to the inner pipe, said method comprising the step of placing said retaining assembly in said first configuration to prevent axial movement of the inner pipe with respect to the outer pipe when the outer pipe is held, such as in a hang off clamp, during welding of adjacent pipe stalks.

In a preferred embodiment said retaining assembly comprises at least one first abutment provided on an inner surface of the outer pipe, at least one second abutment provided on an outer surface of the inner pipe and at least one key member insertable between said first and second abutments to define said first configuration for selectively preventing relative axial movement between said inner and outer pipes, said method comprising the steps of:— i) inserting at least one first key member into the annular space between the inner and outer pipes of a first of said pipe stalks forming an upper end of said pipe-in-pipe pipeline, whereby said at least one first key member is located between the first and second abutments of said first pipe stalk to prevent axial movement of the inner pipe of said first pipe stalk with respect to the outer pipe of said first pipe stalk in a downwards direction;

ii) holding said first pipe stalk, and any further pipe stalks already connected thereto to form said pipe-in-pipe pipeline, in a vertical position such as in a hang off clamp;

iii) abutting an inner pipe of a further pipe stalk against an upper end of the inner pipe of said first pipe stalk and welding said inner pipe of the further pipe stalk to said inner pipe of said first pipe stalk;

iv) axially moving an outer pipe of said further pipe stalk with respect to said inner pipe of said further pipe stalk until said outer pipe of said further pipe stalk abuts said outer pipe of said first pipe stalk and welding said outer pipe of said further pipe stalk to said outer pipe of said first pipe stalk such that said first and further pipe stalks are joined to define a portion of said pipe-in-pipe pipeline, the first abutment of the further pipe stalk moving past the second abutment of said further pipe stalk during said axial movement;

v) inserting at least one further key member into the annular space between said inner and outer pipes of said further pipe stalk whereby said at least one further key member is located between the first and second abutments of said further pipe stalk to restrain axial movement of the inner pipe of said further pipe stalk with respect to the outer pipe of said further pipe stalk in a downwards direction;

vi) lowering said pipeline, such as through the hang off clamp until the outer pipe of the further pipe stalk is vertically repositioned, such as held by the hang off clamp;

vii) repeating steps (ii) to (vi) to join a yet further pipe stalk to said pipe-in-pipe pipeline.

Preferably the step of inserting said at least one first or said at least one further key member comprises axially inserting the key member into said annular space past the second abutment to abut said first abutment and subsequently rotating said at least one key member to extend between said first and second abutments.

The method may comprise the further step of holding the outer pipe of said further pipe in a raised position with respect to said inner pipe of said further pipe during step (iii). The step of holding the outer pipe with respect to the inner pipe of said further pipe may comprise attaching an elongate holding means to said further pipe, said holding means having a first end that is attached to said second abutments provided on said inner pipe and a hook shaped second end that is hooked over an upper edge of the outer pipe.

The method may comprise the further step of applying a thermally insulating media around exposed sections of inner pipes of the first and further pipe stalks following the welding operation of step (iii).

Thus, the present invention provides a method and apparatus of forming a pipe-in-pipe pipeline from a plurality of pipe stalks that enables the inner and outer pipes of each pipe stalk to be welded to the pipeline on the pipe take-off assembly of a pipe laying vessel, greatly facilitating and speeding up the pipe laying and assembly operation.

An embodiment of the present invention will now be described, by way of example only, with reference to the accompanying drawings, in which:

DESCRIPTION OF PREFERRED EMBODIMENTS

In an embodiment of the present invention, a pipe-in-pipe pipeline is formed from a plurality of individual pipe stalks or sections 2, each comprising an outer pipe 4 and a concentrically arranged inner pipe 6, an insulation material 8 being provided in the annular space between the inner and outer pipes to thermally insulate the pipeline. The inner pipe 6 defines a flowline for carrying a fluid, such as crude oil or gas.

Figure 1A:
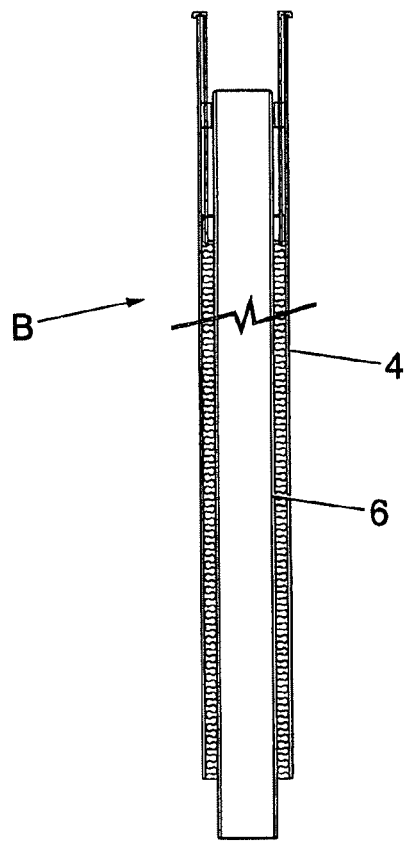
FIG. 1A is a sectional view through a pipe stalk (B) located above the upper part of a pipeline (A) shown in FIG. 1B comprising one or more such pipe stalks, during the process of joining the pipe stalk to the pipeline; in accordance with various embodiments of the present invention.
Figure 1B:
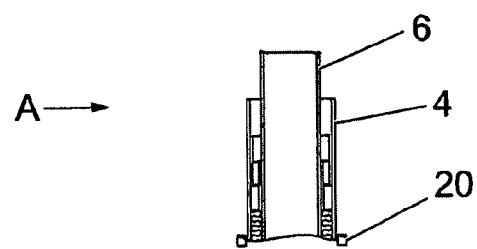
FIG. 1C is an enlarged sectional view through the upper part of the pipe stalk of FIG. 1A.
Figure 1C:
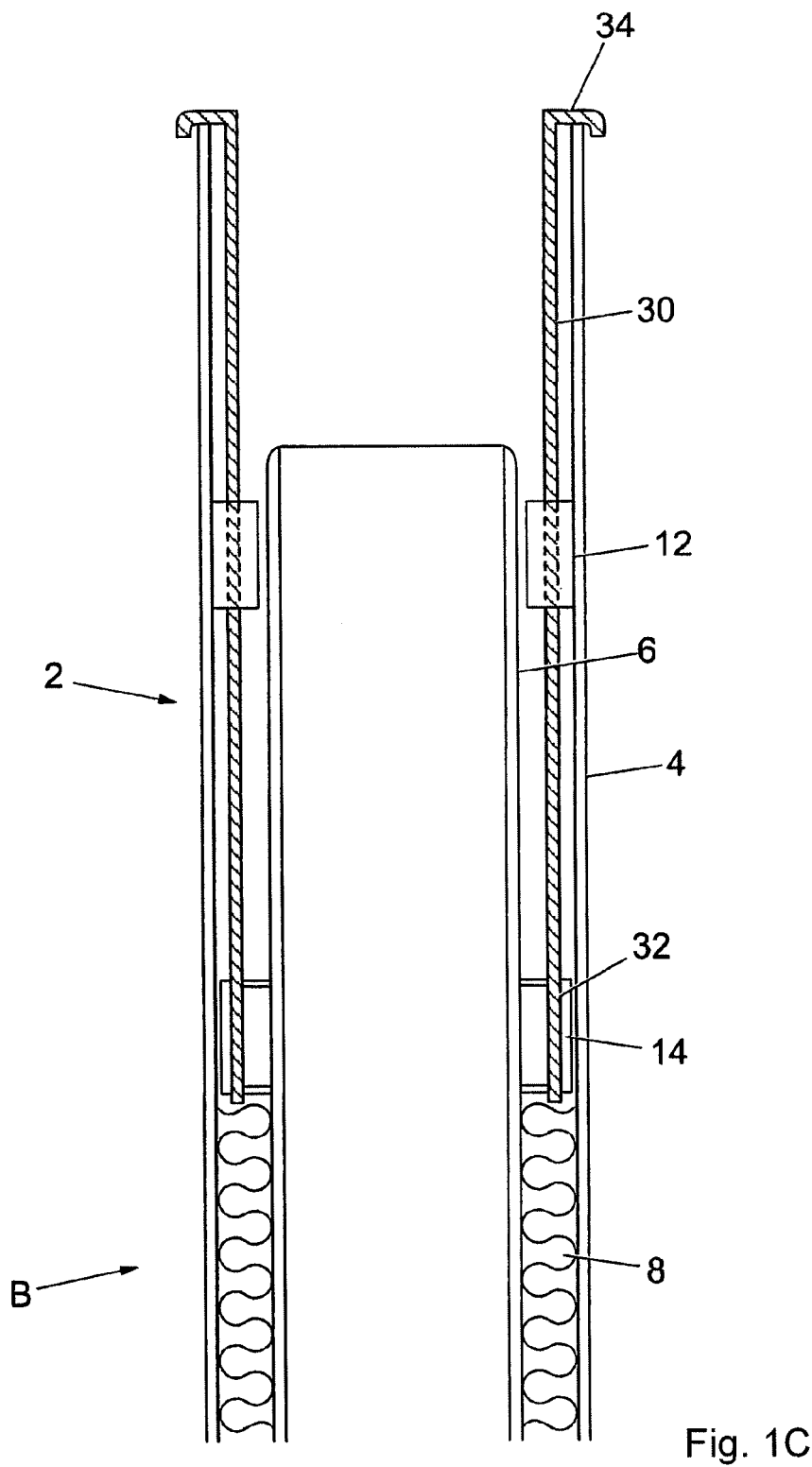

FIG. 1A shows a typical pipe stalk labelled "B" as an embodiment of the present invention, and FIG. 1B shows the top of a pipe-in-pipe pipeline labelled "A", being the upper or top part or section of another pipe stalk, held in a hang off clamp 20. FIG. 1C is an enlarged sectional view through just the uppermost part of the pipe stalk B of FIG. 1A, and FIG. 2 shows the step of joining the bottom of the inner pipe 6 of the pipe stalk B to the top of the inner pipe 6 of the pipeline A once the pipe stalk B has been lowered to meet the pipeline A as described further below.

Figure 2:
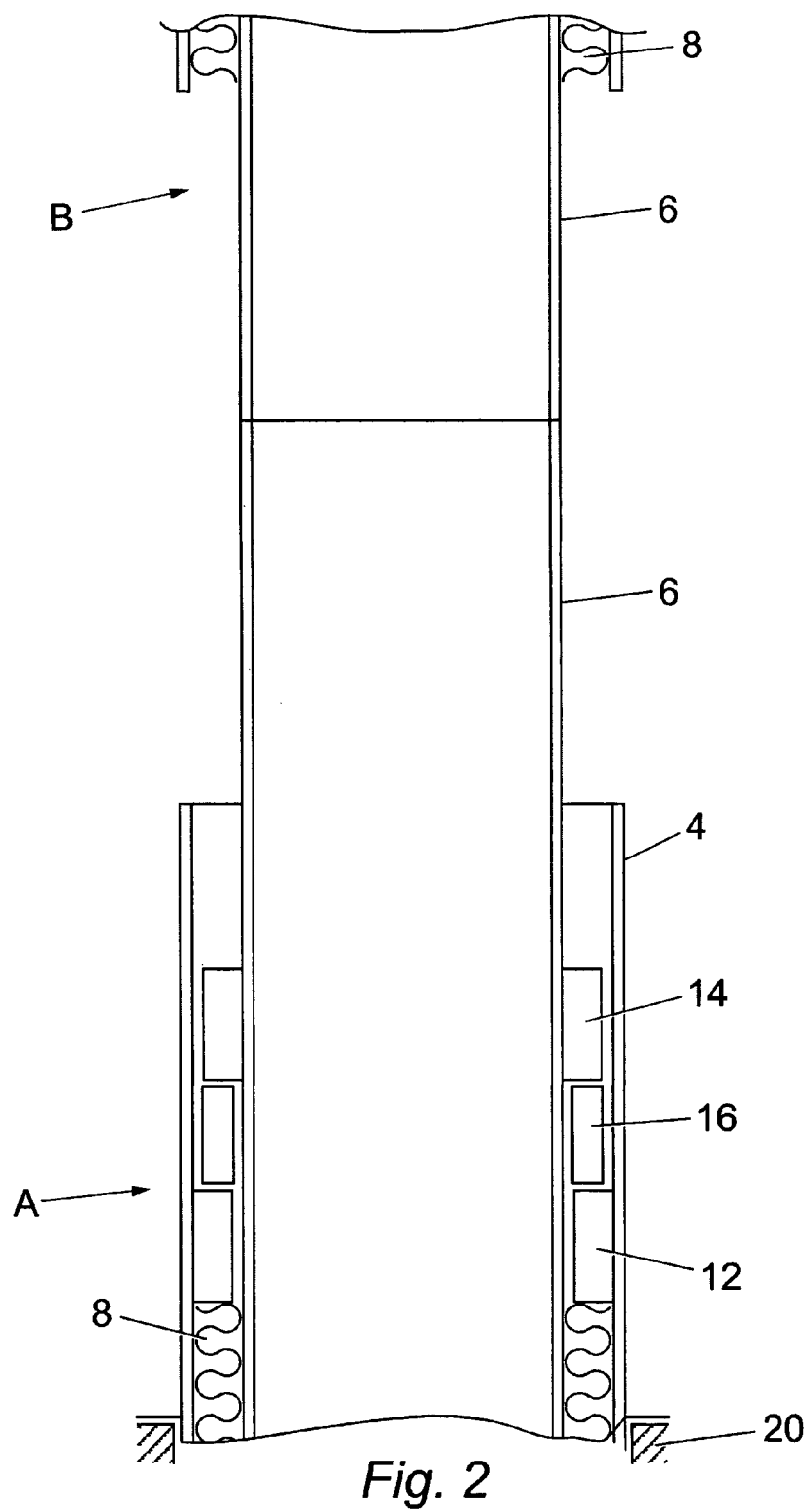
FIG. 2 is a sectional view showing the step of joining the bottom of the inner pipe of the pipe stalk of FIG. 1A to the top of the inner pipe of the pipeline of FIG. 1B.
Figure 6:
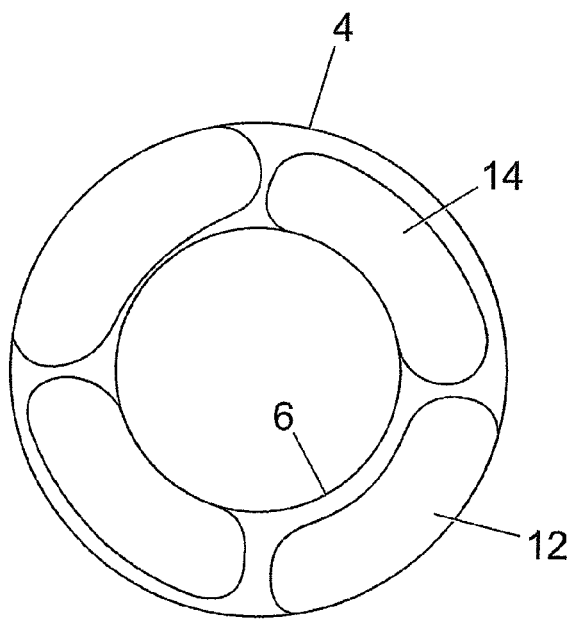
FIG. 6 is a plan view on line A-A of FIG. 5 prior to installation of the key members.

As shown more clearly in FIGS. 1C and 2, the outer pipe 4 of each pipe stalk 2 is provided with a pair of diametrically opposed first abutments 12 extending from the inner surface thereof adjacent an upper end of the pipes 4, each first abutment 12 extending approximately 90° around the circumference of the annular space between the inner and outer pipes 6, 4, as best seen from FIG. 6. The inner pipe 6 of each pipe stalk 2 is provided with a part of diametrically opposed second abutments 14 extending radially from the outer surface thereof adjacent an upper end of the inner pipe 6, each second abutment 14 extending radially approximately 90° around the circumference of the annular space between the inner and outer pipes 6, 4, the second abutments 14 being circumferentially offset from the first abutments 12 by 90° such that the first abutments 12 can move past and between the second abutments 14 during axial movement of the outer pipe 4 with respect to the inner pipe 6.

In order to selectively prevent axial movement of the inner pipe 6 with respect to the outer pipe 4 when the outer pipe 4 is held in a hang off clamp or running tensioner 20, a pair of key members 16 are inserted between the first and second abutments 12, 14, as shown in FIG. 2, to block axial movement of the second abutments 14 past the first abutments 12, as will be described below in more detail.

In an alternative embodiment, the key members may be helix shaped in order to facilitate their insertion into the annular space between the first and second abutment.

As illustrated in FIGS. 1A, 1B, and 2, initially, the pipeline A is retained on the hang off clamp (HOC) 20 of the pipelaying vessel. Key members 16 are located in the space between the first and second abutments of at least the uppermost pipe stalk or section of the pipeline A.

The pipe stalk B is lowered into position above the pipeline A until the inner pipe 6 of the pipe stalk B abuts against the inner pipe 6 of the pipeline A, whereby said inner pipes 6 can be welded together.

The pipe stalk B can be held in a running tensioner (not shown) which clamps the outer pipe 4 of the pipe stalk B. Elongate retaining rods 30 have been inserted into the annular space between the inner and outer pipes 6, 4 of the pipe stalk B. The retaining rods 30 are attached to the second abutments 14 of the inner pipe 6, for example by screwing a threaded end 32 of each retaining rod 30 into a correspondingly threaded receiving aperture in the respective second abutments 14. The upper ends 34 of the retaining rods 30 are hook shaped to be received over an upper edge of the outer pipe 4 whereby the inner pipe 6 of the pipe stalk B is effectively hung from the outer pipe 4. Once the inner pipe 6 has been welded to the pipeline A, the retaining rods 30 can be removed.

Figure 3:
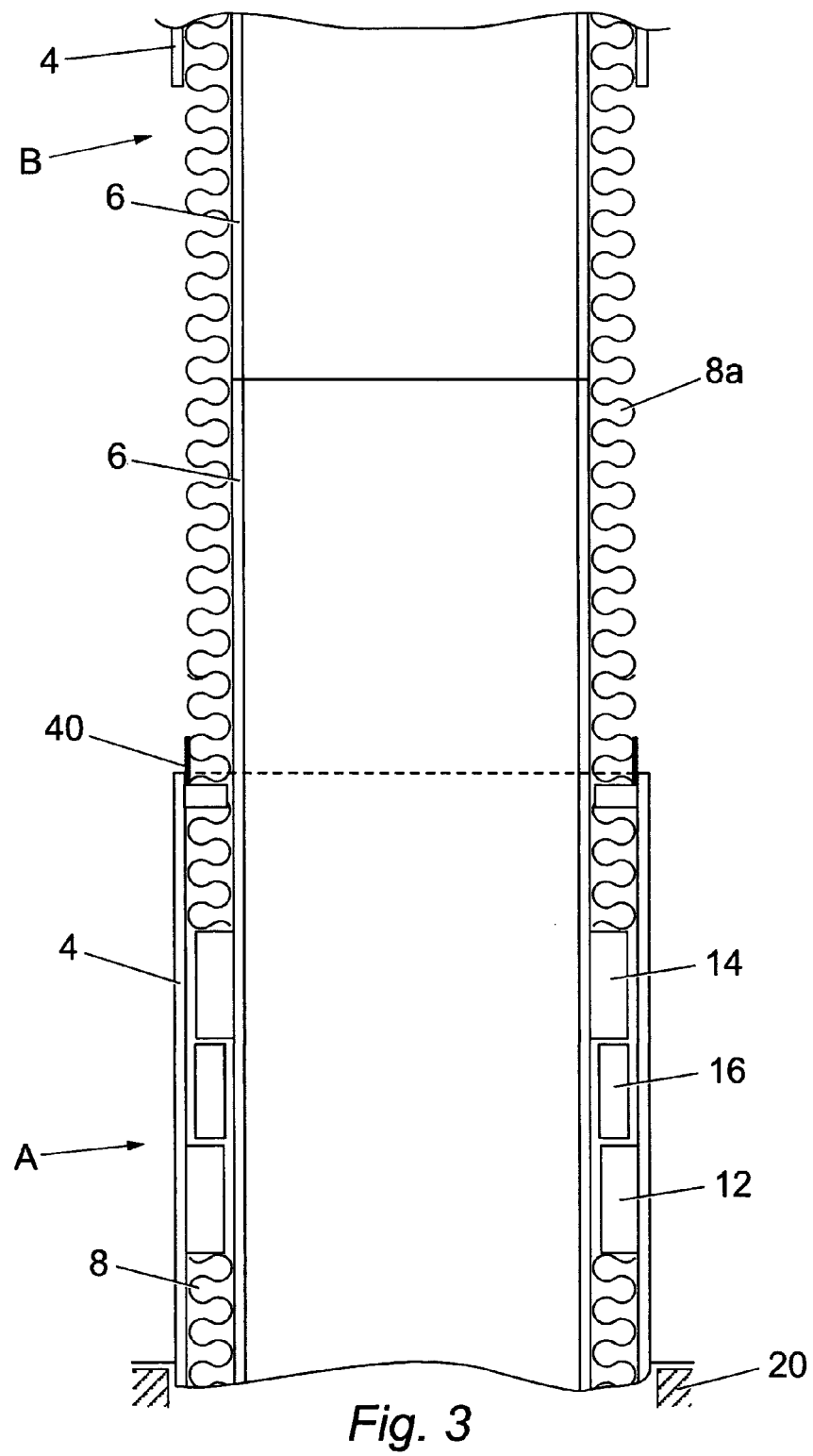
FIG. 3 is a sectional view of a subsequent step of the method.
Figure 4:
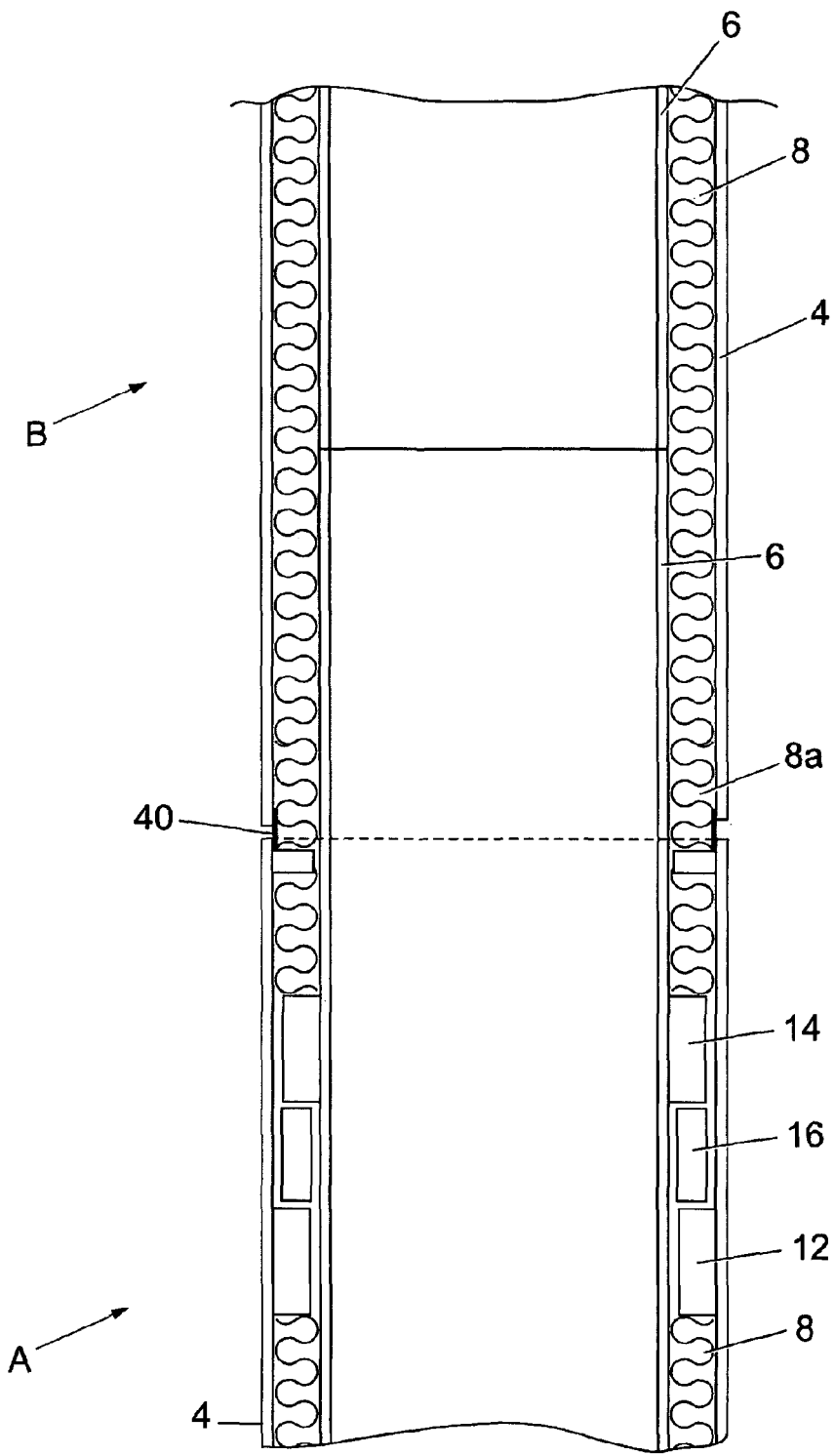
FIG. 4 is a sectional view of the final step of the method showing the step of joining the bottom of the outer pipe of the pipe stalk to the top of the outer pipe of the pipeline.

Next, as shown in FIG. 3, insulation material 8a is placed over the exposed ends of the joined inner pipes 6 of the pipeline A and the pipe stalk B, and the outer pipe 4 of the pipe stalk B is lowered until it abuts the outer pipe 4 of the pipeline A. The abutting outer pipes 4 are now welded together, as shown in FIG. 4. A heat shield 40 may be inserted beneath the junction of the adjacent outer pipes 4 to protect the insulation material 8a from the heat of the welding operation.

Figure 5:
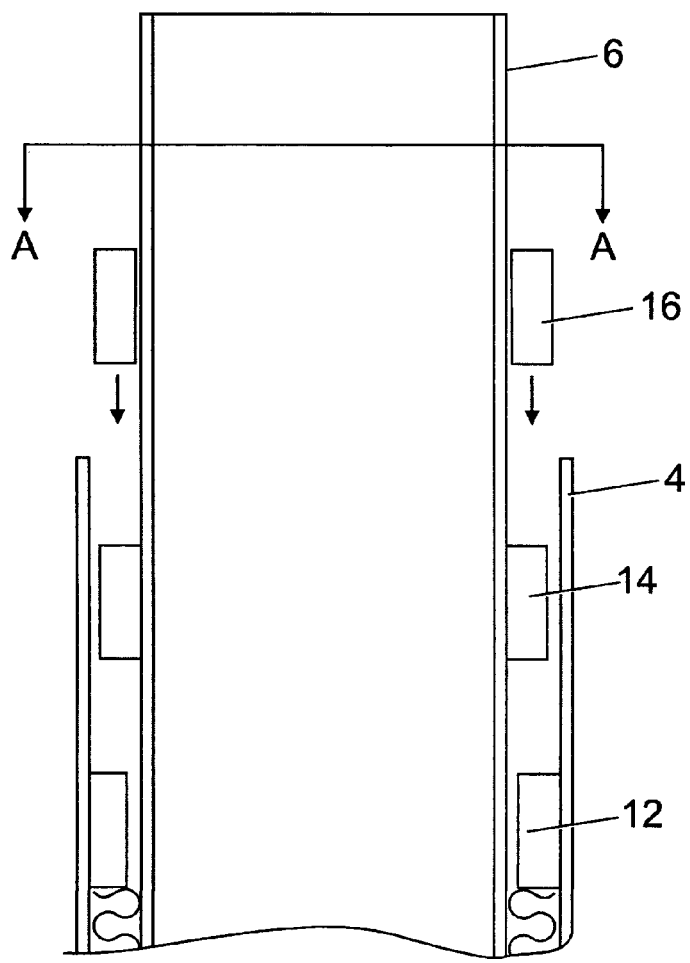
FIG. 5 is a sectional view showing the installation of key members into a pipe stalk.
Figure 7:
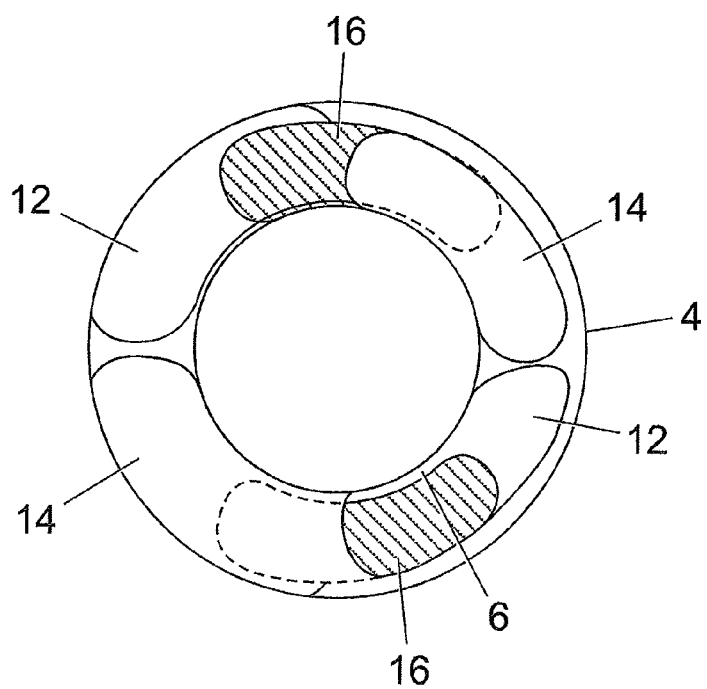
FIG. 7 is a plan view of the pipeline showing the key members in their installed positions.

Key members 16 are then inserted between the first and second abutments 12, 14 of the pipe stalk B, either during or after the welding of the outer pipes, and the method is then ready for the addition of another pipe stalk to the top or upper end of pipe stalk B. That is, pipe stalk B has become the new end of the pipeline, and so takes the position at the head of the pipeline A, for addition of a further pipe stalk (not shown) thereto using the same method, and so on repeatedly, to continue the creation of the pipeline The installation of the key members 16 is shown in FIG. 5, and is achieved by first axially inserting the key members 16 into the annular space between the inner and outer pipes 4, 6 until the key members 16 rest on the upper surface of the first abutments 12, the key members 16 moving axially past the second abutments 14 during such process. Subsequently the key members 16 are slid sideways in a circumferential direction to partially extend beneath the second abutments 14 as shown in FIG. 7, such that a first portion of each key member 16 is in contact with the upper face of a respective first abutment member 12 and a second portion of each key member 16 is in contact with a lower face of a respective second abutment member 14, the key members 16 thereby preventing axial movement of the second abutments 14 towards the first abutments 12 and thereby supporting the inner pipe 6 within the outer pipe 4.

Various modifications and variations to the described embodiment of the invention will be apparent to those skilled in the art without departing from the scope of the invention as defined in the appended claims. Although the invention has been described in connection with a specific preferred embodiment, it should be understood that the invention as claimed should not be unduly limited to such specific embodiment.

What is claimed is:

1. A pipe stalk for a pipe-in-pipe pipeline, said pipe stalk comprising an outer pipe and at least one inner pipe located within the outer pipe, and having a retaining assembly, the retaining assembly in a first configuration comprising at least one first abutment provided on an inner surface of the outer pipe, at least one second abutment provided on an outer surface of the at least one inner pipe circumferentially offset from the at least one first abutment so that there is no overlap between the at least one first abutment and the at least one second abutment blocking axial movement of the at least one first abutment and the at least one second abutment past each other, and at least one key member in an annular space between the at least one inner pipe and the outer pipe positioned so as to overlap the at least one first abutment and the at least one second abutment and to block axial movement of the at least one first abutment and the at least one second abutment past each other, the first configuration preventing axial movement of the at least one inner pipe with respect to the outer pipe, the retaining assembly in a second configuration comprising the at least one first abutment and the at least one second abutment in the same relative circumferential positions as in the first configuration, the second configuration not including the at least one key member, the second configuration allowing axial movement of the outer pipe with respect to the at least one inner pipe.

2. A pipe stalk as claimed in claim 1, wherein at least two circumferentially spaced first abutments are provided on an inner surface of the outer pipe, at least two circumferentially spaced second abutments are provided on an outer surface of the at least one inner pipe and at least two key members are provided to be insertable into the annular space between the at least one inner pipe and the outer pipe.

3. A pipe stalk as claimed in claim 1, wherein said at least one first and second abutments each extend between the at least one inner pipe and the outer pipe over a segment of said annular space between said at least one inner pipe and said outer pipe of said pipe stalk.

4. A pipe stalk as claimed in claim 3, wherein a sum of circumferential lengths of the at least one first and second abutments are substantially equal to a circumference of said annular space.

5. A pipe stalk as claimed in claim 1, wherein said at least one key member comprises a segment of a ring having an inner diameter substantially equal to an outer diameter of the at least one inner pipe and an outer diameter substantially equal to an inner diameter of the outer pipe.

6. A pipe stalk as claimed in claim 1, wherein the outer pipe is provided with a pair of first abutments provided on the inner surface of the outer pipe at diametrically opposed locations thereon, said at least one inner pipe being provided with a pair of second abutments provided on the outer surface of the at least one inner pipe at diametrically opposed locations thereon, said pair of first abutments being spaced approximately 90° from said pair of second abutments in a circumferential direction, a pair of key members being provided to be insertable between the pairs of the first and second abutments.

7. A pipe stalk as claimed in claim 1, wherein at least one holding means is provided for selectively retaining the at least one inner pipe with respect to the outer pipe when the pipe stalk is held in a clamp means by said outer pipe in a position wherein said at least one inner pipe extends axially below a lower end of said outer pipe with said at least one first abutment positioned axially above said at least one second abutment to allow the at least one inner pipe to be welded to an upper end of an inner pipe of a pipeline.

8. A pipe stalk as claimed in claim 7, wherein said at least one holding means comprises an elongate member having a first end adapted to engage an upper end of the outer pipe and a second end adapted to be connectable to said at least one second abutment.

9. A pipe stalk as claimed in claim 8, wherein said first end of said elongate member is connectable to an upper edge of the outer pipe.

10. A pipe stalk as claimed in claim 8, wherein the second end of said elongate member is threaded to be received in a corresponding threaded aperture in the at least one second abutment.

11. A pipe stalk as claimed in claim 1, wherein a thermal insulation media is provided in the annular space between the at least one inner pipe and the outer pipe of the pipe stalk.

12. A pipe stalk as claimed in claim 1, wherein the retaining assembly is at or near one end of the pipe stalk.

13. A pipe stalk as claimed in claim 1, wherein the retaining assembly comprises non-joining components.

14. A method of assembling a pipe-in-pipe pipeline from a plurality of pipe stalks, as claimed in claim 1, wherein said retaining assembly of each pipe stalk is moveable between said first configuration, said first configuration preventing axial movement of the at least one inner pipe with respect to the outer pipe in a downwards direction, and said second configuration, said method comprising the step of placing said retaining assembly in said first configuration to prevent axial movement of the at least one inner pipe with respect to the outer pipe when the outer pipe is held during welding of adjacent pipe stalks.

15. A method as claimed in claim 14, wherein said at least one key member is insertable between said at least one first and second abutments, said method comprising the steps of:
i) inserting the at least one key member into the annular space between the at least one inner pipe and the outer pipe of a first of said pipe stalks forming an upper end of said pipe-in-pipe pipeline, whereby said at least one key member is located between the at least one first and second abutments of said first pipe stalk to prevent axial movement of the at least one inner pipe of said first pipe stalk with respect to the outer pipe of said first pipe stalk in a downwards direction;

ii) holding said first pipe stalk, and any further pipe stalks already connected thereto to form said pipe-in-pipe pipeline, in a vertical position in a hang off clamp;

iii) abutting at least one inner pipe of a further pipe stalk against an upper end of the at least one inner pipe of said first pipe stalk and welding said at least one inner pipe of the further pipe stalk to said at least one inner pipe of said first pipe stalk;

iv) axially moving an outer pipe of said further pipe stalk with respect to said at least one inner pipe of said further pipe stalk until said outer pipe of said further pipe stalk abuts said outer pipe of said first pipe stalk and welding said outer pipe of said further pipe stalk to said outer pipe of said first pipe stalk such that said first and further pipe stalks are joined to define a portion of said pipe-in-pipe pipeline, at least one first abutment of the further pipe stalk moving past at least one second abutment of said further pipe stalk during said axial movement;

v) inserting at least one further key member into the annular space between said at least one inner pipe and said outer pipe of said further pipe stalk whereby said at least one further key member is located between the at least one first and second abutments of said further pipe stalk to restrain axial movement of the at least one inner pipe of said further pipe stalk with respect to the outer pipe of said further pipe stalk in a downwards direction;

vi) lowering said pipeline through the hang off clamp, until the outer pipe of the further pipe stalk is vertically repositioned by the hang off clamp;

vii) repeating steps (ii) to (vi) to join a yet further pipe stalk to said pipe-in-pipe pipeline.

16. A method as claimed in claim 15, wherein the step of inserting said at least one key member or said at least one further key member comprises axially inserting the at least one key member or further key member into said annular space past the at least one second abutment to abut said at least one first abutment and subsequently rotating said at least one key member or further key member to extend between said at least one first and second abutments.

17. A method as claimed in claim 15, wherein at least two circumferentially spaced first abutments are provided on an inner surface of each outer pipe, at least two circumferentially spaced second abutments are provided on an outer surface of each at least one inner pipe, and at least two key members are provided to be insertable into the annular space between the at least one inner pipe and the outer pipe, said method comprising the step of axially inserting said at least two key members into said annular space past the at least two second abutments to respectively abut said at least two first abutments and subsequently rotating said at least two key members to extend between respective pairs of said first and second abutments.

18. A method as claimed in claim 15, comprising the further step of holding the outer pipe of said further pipe stalk in a raised position with respect to said at least one inner pipe of said further pipe stalk during step (iii).

19. A method as claimed in claim 18, wherein said step of holding the outer pipe with respect to the at least one inner pipe of said further pipe comprises attaching an elongate holding means to said further pipe, said holding means having a first end that is attached to said at least one second abutment provided on said at least one inner pipe of said further pipe stalk and a second end that is connectable to an upper edge of the outer pipe of said further pipe stalk.

20. A method as claimed in claim 15, comprising the further step of applying a thermally insulating material around exposed sections of the at least one inner pipes of the first and further pipe stalks following the welding operation of step (iii).

* * * * *

UNITED STATES PATENT AND TRADEMARK OFFICE
CERTIFICATE OF CORRECTION

PATENT NO. : 8,585,097 B2  Page 1 of 1
APPLICATION NO. : 12/744960
DATED : November 19, 2013
INVENTOR(S) : Pillai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 484 days.

Signed and Sealed this
Twenty-second Day of September, 2015

Michelle K. Lee
*Director of the United States Patent and Trademark Office*